United States Patent
Nguyen et al.

(10) Patent No.: US 10,145,984 B2
(45) Date of Patent: Dec. 4, 2018

(54) SYSTEM, METHOD AND COMPUTER PROGRAM PRODUCT FOR SMART GROUPING OF SEISMIC INTERPRETATION DATA IN INVENTORY TREES BASED ON PROCESSING HISTORY

(71) Applicant: Landmark Graphics Corporation, Houston, TX (US)

(72) Inventors: Nam Xuan Nguyen, Katy, TX (US); Duane Dargan Kilgore, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 231 days.

(21) Appl. No.: 14/888,397

(22) PCT Filed: Jun. 28, 2013

(86) PCT No.: PCT/US2013/048648
§ 371 (c)(1),
(2) Date: Oct. 30, 2015

(87) PCT Pub. No.: WO2014/209375
PCT Pub. Date: Dec. 31, 2014

(65) Prior Publication Data
US 2016/0097880 A1    Apr. 7, 2016

(51) Int. Cl.
*G06G 7/48*    (2006.01)
*G01V 99/00*    (2009.01)
*G06F 17/30*    (2006.01)

(52) U.S. Cl.
CPC ...... *G01V 99/005* (2013.01); *G06F 17/30061* (2013.01); *G06F 17/30327* (2013.01); *G06F 17/30601* (2013.01)

(58) Field of Classification Search
None
See application file for complete search history.

(56) References Cited

U.S. PATENT DOCUMENTS

| 7,561,997 | B1* | 7/2009 | Miller | G01V 11/00 367/81 |
|---|---|---|---|---|
| 2005/0166094 | A1 | 7/2005 | Blackwell et al. | |
| 2005/0262108 | A1 | 11/2005 | Gupta | |
| 2009/0106732 | A1* | 4/2009 | Hanson | G06F 17/30324 717/104 |
| 2013/0151161 | A1* | 6/2013 | Imhof | G01V 1/003 702/14 |

OTHER PUBLICATIONS

European Patent Office, Supplementary European Search Report, dated Jun. 29, 2016, 7 pages, Europe.
International Search Report, dated Jan. 14, 2014, 8 pages; United States International Searching Authority.

* cited by examiner

*Primary Examiner* — Cory W Eskridge

(57) ABSTRACT

A system and method to intelligently group seismic interpretation data, retrieved from an interpretation workflow, in an inventory tree based upon processing history records automatically captured during generation of volume and horizon datasets. As new volume and horizon datasets are created during the interpretation workflow, the relationships between the datasets are stored within system records. Inventory trees are then generated and/or updated based upon these records to intuitively display the relationships between the volume and horizon datasets.

20 Claims, 7 Drawing Sheets

SYSTEM, METHOD AND COMPUTER PROGRAM PRODUCT FOR SMART GROUPING OF SEISMIC INTERPRETATION DATA IN INVENTORY TREES BASED ON PROCESSING HISTORY

CROSS-REFERENCE TO RELATED APPLICATIONS

This application is a U.S. national stage patent application of International Patent Application No. PCT/US2013/048648, filed on Jun. 28, 2013, the benefit of which is claimed and the disclosure of which is incorporated herein by reference in its entirety.

FIELD OF THE DISCLOSURE

The present disclosure relates generally to hydrocarbon reservoir modeling and seismic interpretation and, more specifically, to a system that intelligently groups seismic interpretation results in an inventory tree based upon processing history records.

BACKGROUND

In hydrocarbon exploration, accurately understanding the economic projections of a reservoir is vitally important. Conventional approaches to such analysis include the use of earth modeling systems that utilize seismic data to simulate subsurface geological structures, such as faults or other stratigraphic features. Seismic-data traces are the record of the reflection of sonic waves from underground. These traces can be denoted as A(x, y, t), the reflection amplitude of time t at surface location (x, y). Seismic interpretation results include volumes and horizons, which are ultimately utilized to generate a model of the reservoir representative of the structure (stratigraphic layers, faults, etc.) of the formation.

The seismic volumes are three-dimensional volume datasets within a 3D seismic survey or two-dimensional datasets along 2D seismic line. Horizons that are interpreted from the seismic volumes represent the stratigraphic layers along the reservoir model. During the interpretation workflow, additional seismic attributes volumes are generated from the parent input volumes to represent some measured or calculated seismic-petrophysical reservoir property. Likewise, additional horizon attributes are extracted from a parent input horizon and parent input volume to gain better understand of reservoir stratigraphic features. Information from different volume and horizon datasets are extracted to thereby analyze the desired sub-surface geological structures.

The extracted information may be arranged in an inventory tree fashion. Managing the voluminous datasets in the inventory tree, however, has been a longstanding challenge in the industry. As the user creates more and more datasets, the inventory tree eventually becomes unmanageable because conventional models fail to display the relationship between the datasets or their processing history. As a result, the inventory tree ultimately becomes an unintelligible listing of data, with no real method by which to decipher their interrelationships.

In view of the foregoing, there is a need in the art for a system to intelligently group seismic interpretation data in an inventory tree, thus enabling users to analyze numerous volume and horizon datasets in an effective manner to thereby accurately determine the economic projections of a reservoir.

DESCRIPTION OF ILLUSTRATIVE EMBODIMENTS

Illustrative embodiments and related methodologies of the present disclosure are described below as they might be employed in a system which intelligently auto-groups seismic interpretation data in an inventory tree based upon processing history records. In the interest of clarity, not all features of an actual implementation or methodology are described in this specification. Also, the "exemplary" embodiments described herein refer to examples of the present disclosure. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of this disclosure will become apparent from consideration of the following description and drawings.

Figure 1:
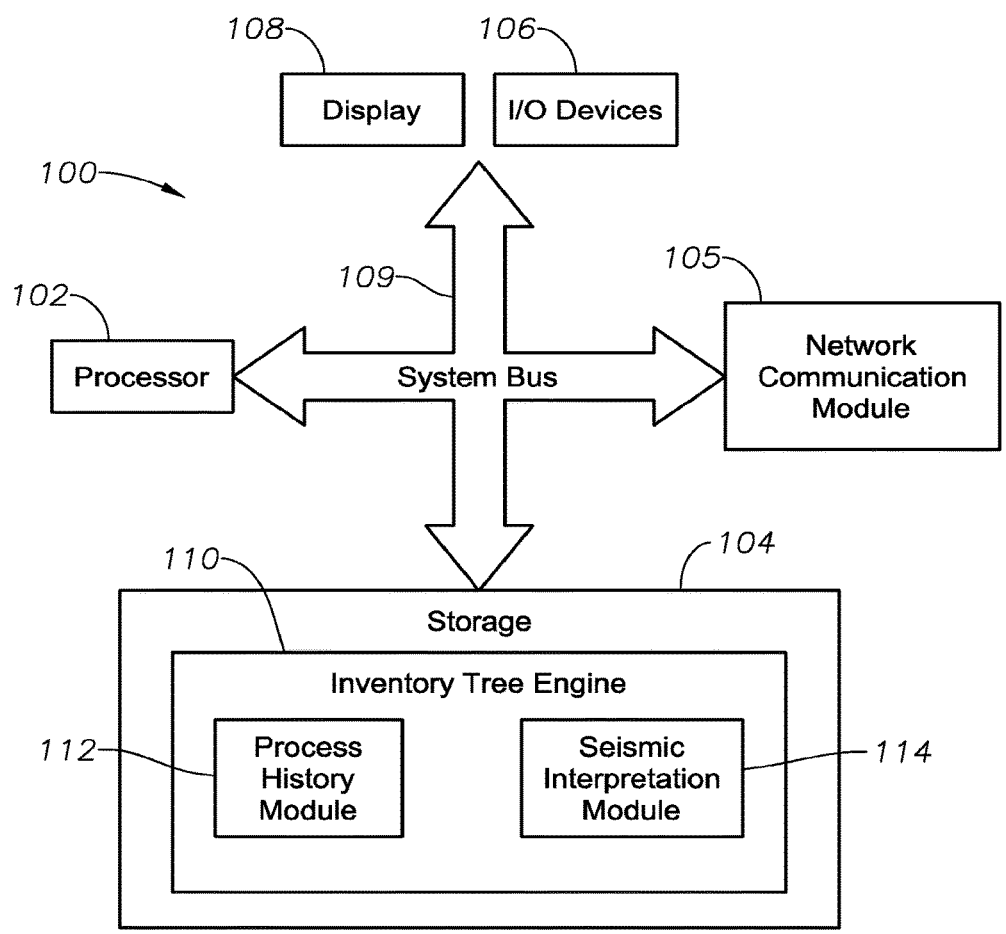
FIG. 1 illustrates a block diagram of a smart grouping system according to certain exemplary embodiments of the present disclosure.

FIG. 1 shows a block diagram of a smart grouping system 100 according to certain exemplary embodiments of the present disclosure. As will be described herein, exemplary embodiments of the present disclosure intelligently group seismic interpretation data in an inventory tree based upon processing history records automatically captured during generation of volume and horizon datasets. As new volume and horizon datasets are created during the interpretation workflow, the relationship between the datasets are automatically captured and stored within processing history records. Using these records, embodiments of the present disclosure generate inventory trees that group the datasets in a variety of intelligent ways based upon their relationships to one another. For example, such smart groupings may include a parent horizon followed by a parent volume and child horizons or, alternatively, by parent volume followed by parent horizon and then child horizon. Accordingly, through the use of intelligent hierarchical groupings of volume and horizon datasets, the present disclosure provides a very powerful processing history data management solution that displays vast amounts of data in an intuitive and easy to understand method.

Referring to FIG. 1, exemplary smart grouping system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within inventory tree engine 110 in accordance with the exemplary embodiments described herein, may be stored in storage 104 or some other computer-readable medium. Although not explicitly shown in FIG. 1, it will be recognized that smart grouping system 100 may be connected to one or more public and/or private networks via one or more appropriate network connections. It will also be recognized that the software instructions embodying inventory tree engine 110 may also be loaded into storage 104 from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Still referring to FIG. 1, in certain exemplary embodiments, inventory tree engine 110 includes process history module 112 and seismic interpretation module 114. Process history module 112 provides robust data capture, storage, retrieval and integration of historical data, such as, for example, capturing the history of processes performed upon seismic data and its interpretation. In other embodiments, process history module may also process other reservoir related data that spans across all aspects of the well planning, construction and completion processes such as, for example, drilling, cementing, wireline logging, well testing and stimulation. Such datasets include, for example, seismic datasets representing various petrophysical properties as understood in the art. Moreover, such data may include, for example, open hole logging data, well trajectories, surface data, fault data, data from surrounding wells, data inferred from geostatistics, etc. The database (not shown) which stores this data may reside within process history module 112 or at a remote location. An exemplary database platform is, for example, the INSITE® software suite, commercially offered through Halliburton Energy Services Inc. of Houston Tex. Those ordinarily skilled in the art having the benefit of this disclosure realize there are a variety of software platforms and associated systems to retrieve, store and integrate the well related data, as described herein.

Still referring to the exemplary embodiment of FIG. 1, inventory tree engine 110 also includes seismic interpretation module 114 to integrate with the data contained within process history module 112 in order to provide subsurface stratigraphic visualization including, for example, geo science interpretation. Exemplary seismic interpretation platforms include, for example, DecisionSpace®, which is commercially available through the Assignee of the present disclosure, Landmark Graphics Corporation of Houston, Tex. However, those ordinarily skilled in the art having the benefit of this disclosure realize a variety of other seismic interpretation platforms may also be utilized with the present disclosure. Moreover, inventory tree engine 110 may also include multi-domain workflow automation capabilities that may connect any variety of desired technical applications.

Figure 2A:
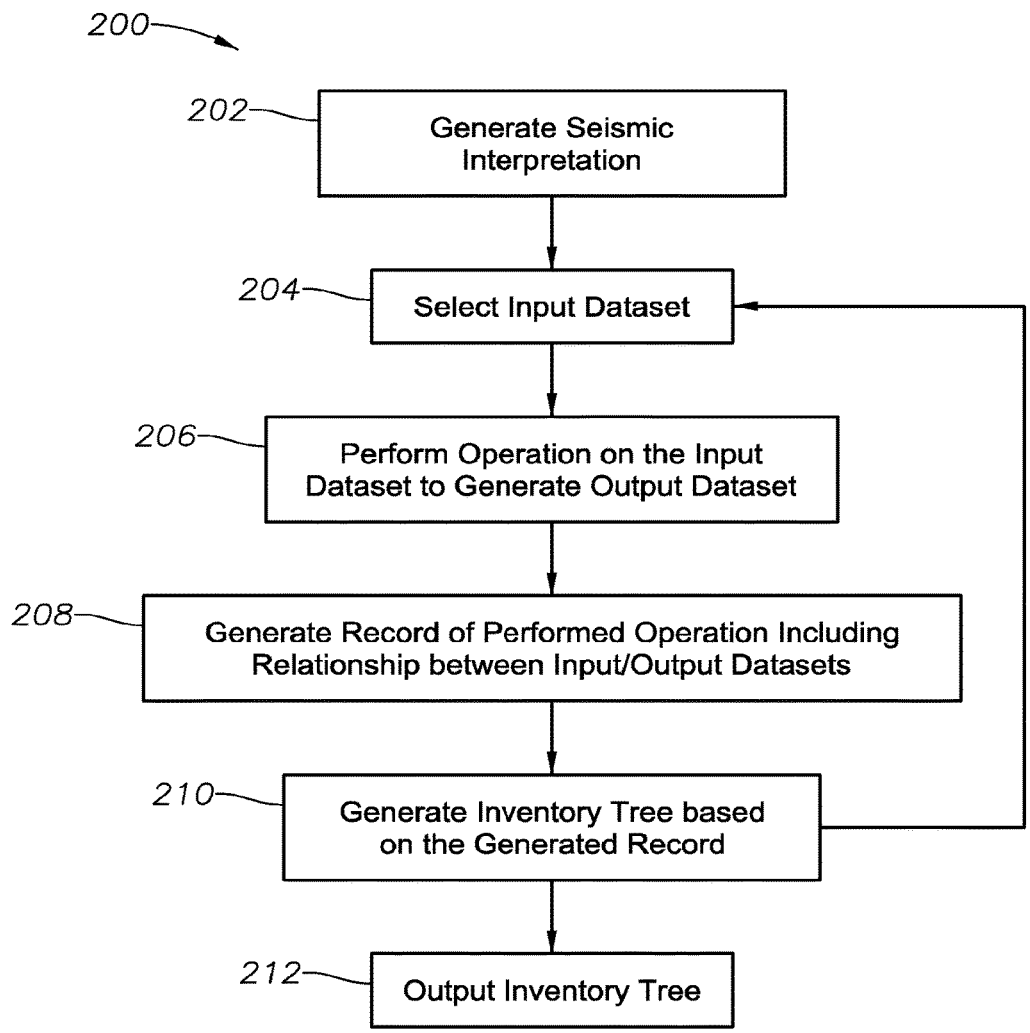
FIG. 2A is a flow chart of a methodology utilized to generate intelligently grouped inventory trees based on processing history data, according to certain exemplary methodologies of the present disclosure.

Referring to FIG. 2A, an exemplary method 200 of the present disclosure utilized to generate intelligently grouped inventory trees based on processing history data will now be described. At block 202, via seismic interpretation module 114, processor 102 generates a new seismic interpretation which includes seismic and horizons datasets that represent various seismic-petrophysical properties of the hydrocarbon reservoir. Examples of attributes seismic data values include amplitude, phase, frequency, and semblance.

Figure 2B:
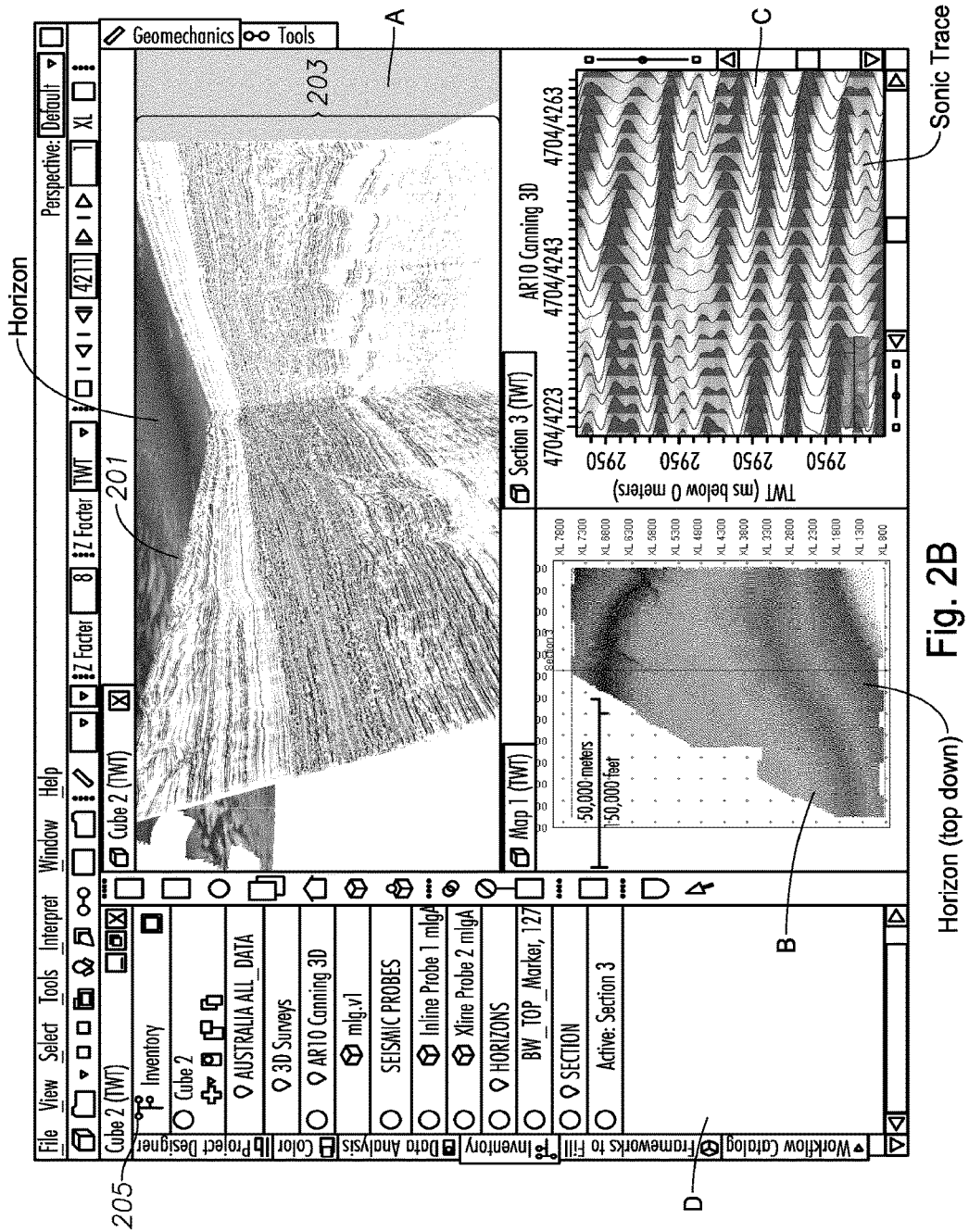
FIG. 2B illustrates an exemplary user interface displaying a seismic interpretation dataset generated by smart grouping system, according to certain exemplary embodiments of the present disclosure.

At block 204, via a user interface, an input dataset is selected to thereby begin the desire process or operation such as structural horizon interpretation, amplitude extraction and seismic attribute volumes generation. To illustrate this feature, FIG. 2B illustrates an exemplary user interface 200 displaying a structural horizon generated by smart grouping system 100. In Window A, a volume dataset 201 has been selected at block 204 as an input dataset and is shown including a number of horizon datasets 203. Although shown in a cut-away fashion, volume dataset 201 may also be displayed as a two or three dimensional cube, as will be understood by those ordinarily skilled in the art having the benefit of this disclosure. Window B illustrates a top-down view of a selected horizon dataset 203 from within volume dataset 201, and Window C illustrates the sonic trace of the selected seismic dataset. The X and Y axes in Window B are in real world coordinates in a cartographic projection. The units may be in, for example, feet or meters. The X axis in Window C identifies the inline and crossline survey coordinates of the seismic traces being displayed. The Y axis in Window C is two-way travel time or depth if the seismic has been converted to depth.

At block 204, the input dataset may be a variety of datasets within the reservoir model. For example, the input dataset may be a two or three dimensional volume dataset (volume dataset 201 or a volume within volume dataset 201, for example) or an interpreted horizon dataset representing a stratigraphic layer along a volume dataset. The selection of the input dataset may be accomplished, for example, via the user interface whereby the user selects from a list of available datasets that have been loaded into the session.

Once the input dataset has been selected, processor 102 performs an operation on the input dataset to thereby generate an output dataset reflecting one or more seismic-petrophysical properties at block 206. Exemplary operations include, for example, an amplitude, phase, frequency, structure, or relief analysis of the input dataset, as will be understood by those ordinarily skilled in the art having the benefit of this disclosure. As an example, seismic attribute calculations transform seismic data of one property and generate a seismic volume of a different property. These volumes can enhance different subsurface features thus giving a better overall understanding of the subsurface. The output dataset may include, for example, volume datasets or horizon datasets. The type of process being executed determines the input and output data types. For example, an amplitude extraction process requires an input seismic volume (3D) and an input structure horizon (2D). The output is an amplitude horizon (2D).

At block 208, via process history module 112, processor 102 generates a record of the operation performed on the input dataset and stores it in remote or local memory. In addition to the operation performed, the record may include a variety of other data including, for example, the relationship between the input and output data sets. Such relationship data might include the parent and child information; in this example, the parent would be the input dataset and the child would be the output dataset. Accordingly, if a volume dataset was the input and a horizon dataset the output, process history module 112 would record the volume dataset as the parent and the horizon dataset as the child, thus reflecting the relationship between the two. In certain exemplary embodiments, each time another operation is performed on a selected input dataset, process history module 112 updates the record and stores it accordingly.

Figure 2C:
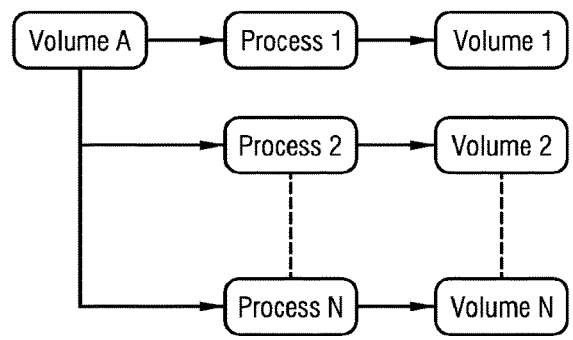
FIGS. 2C, 2D 2E, and 2F illustrate various inventory trees generated using smart grouping system, according to certain exemplary embodiments of the present disclosure.

At block 210, processor 102, via inventory tree engine 110 then generates an inventory tree based upon the record created by process history module 112. The inventory tree may then be output at block 212 in a variety of ways including, for example, display via display 108, some other user interface or printing. In this exemplary embodiment, the inventory tree will include the input dataset, output dataset and the relationship between the input and output datasets. FIG. 2C illustrates one example of an inventory tree generated using smart grouping system 100. In this example, Volume A (a volume dataset) was selected as the input at block 204. In a first iteration, Process 1 was performed on the Volume A at block 206 to thereby generate Volume 1. In this example, arrows are used to intuitively illustrate the relationship and/or data flow between the Volume A and Volume 1. In a second iteration of method 200, Process 2 is performed on Volume A at block 206 to thereby generate Volume 2. In yet another iteration, Process N was performed on Volume A at block 206 to thereby generated Volume N.

Figure 2D:
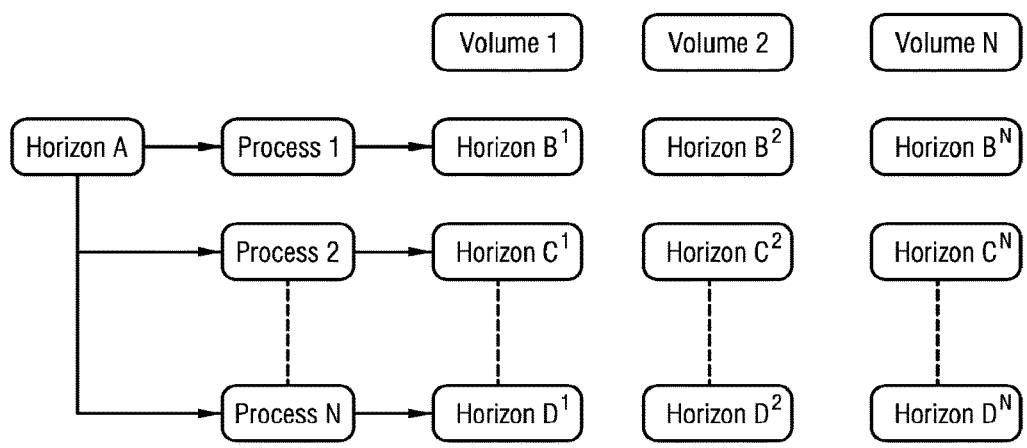

FIG. 2D illustrates another example of an inventory tree generated using smart grouping system 100. Here, the relationships between various horizon and volume datasets are shown. Horizon A was selected at block 204 as the input dataset, resulting in child Horizon $B^1$ generated using Process 1. Process 2 as utilized to generate Horizon $C^1$, and Process N was used to generate Horizon $D^1$. At the same time, the inventory tree of FIG. 2D also shows that Horizons $B^1$, $C^1$, and $D^1$ are also children of Volume 1. In this example, B1 through BN are related to each other in that they all were generated with a process that had Horizon A as the input.

Referring back to block 210, a user may continue selecting input datasets to continue interpreting and analyzing seismic datasets. In such cases, the algorithm of method 200 loops back to block 204, whereby the process repeats itself. In such cases, processor 102 continues to update the inventory tree based upon the updated record stored by process history module 112. Therefore, the user is provided with a current version of the inventory tree showing all relationships between the various input and output datasets.

Figure 2F:
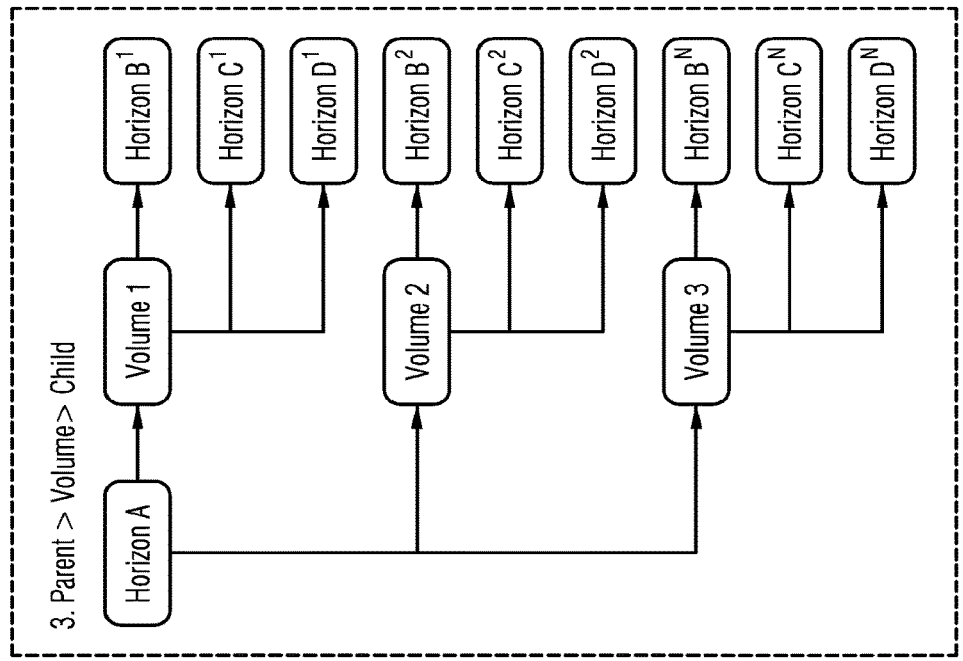
Figure 2E:
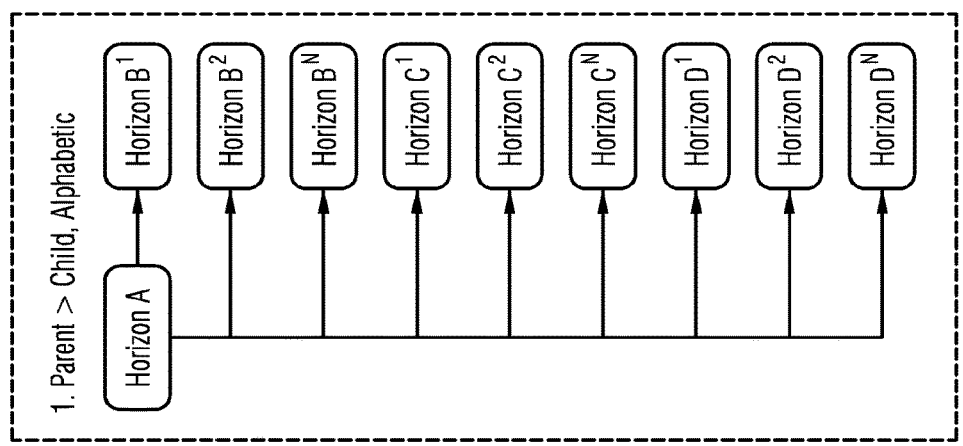

In yet other exemplary embodiments, smart grouping system 100 allows the user to customize the fashion in which the input and output datasets are grouped in relation to one another. For example, FIG. 2E illustrates an inventory tree in which the user has selected alphabetical listing of child output datasets. Here, Horizon A was selected as the input dataset, in which a plurality of Horizons $B^1 \ldots D^N$ were generated using one or more operations (not shown). To achieve this in certain embodiments, the user is allowed to name the output dataset and its parent inputs are automatically captured. Smart grouping system 100 uses the captured relationship between datasets to arrange the inventory tree. The alphabetical arrangement of datasets may be achieved in a variety of ways, including for example, using database key values for each instance of the data. Alternatively, the datasets may be categorized by creation date.

In other exemplary embodiment, smart grouping system 100 generates an inventory tree showing the input horizon dataset-input volume dataset-output horizon dataset. FIG. 2F illustrates such an inventory tree. Horizon A and Volume 1 are inputs to a process or operation that create Horizon B1, Horizon C1, and Horizon D1. Further, it shows that Horizon A and Volume 2 are inputs to a process or processes that create Horizon B2, Horizon C2, and Horizon D2 and so on.

In yet another example, the inventory tree may group the input and output datasets in a fashion such that a parent horizon dataset is followed by a parent volume dataset, the volume dataset then being followed by a child horizon dataset, thereby reflecting the relationship between the input and output datasets. Those ordinarily skilled in the art having the benefit of this disclosure realize there are a variety of ways in which to tailor the inventory tree to clearly reflect the relationships between the input and output datasets.

In either of the example described herein, the user may view the operation performed to generate the child output dataset in a variety of ways. For example, the user may click on an output dataset to see a pop-up of the performed operation and other processing history.

Figure 3:
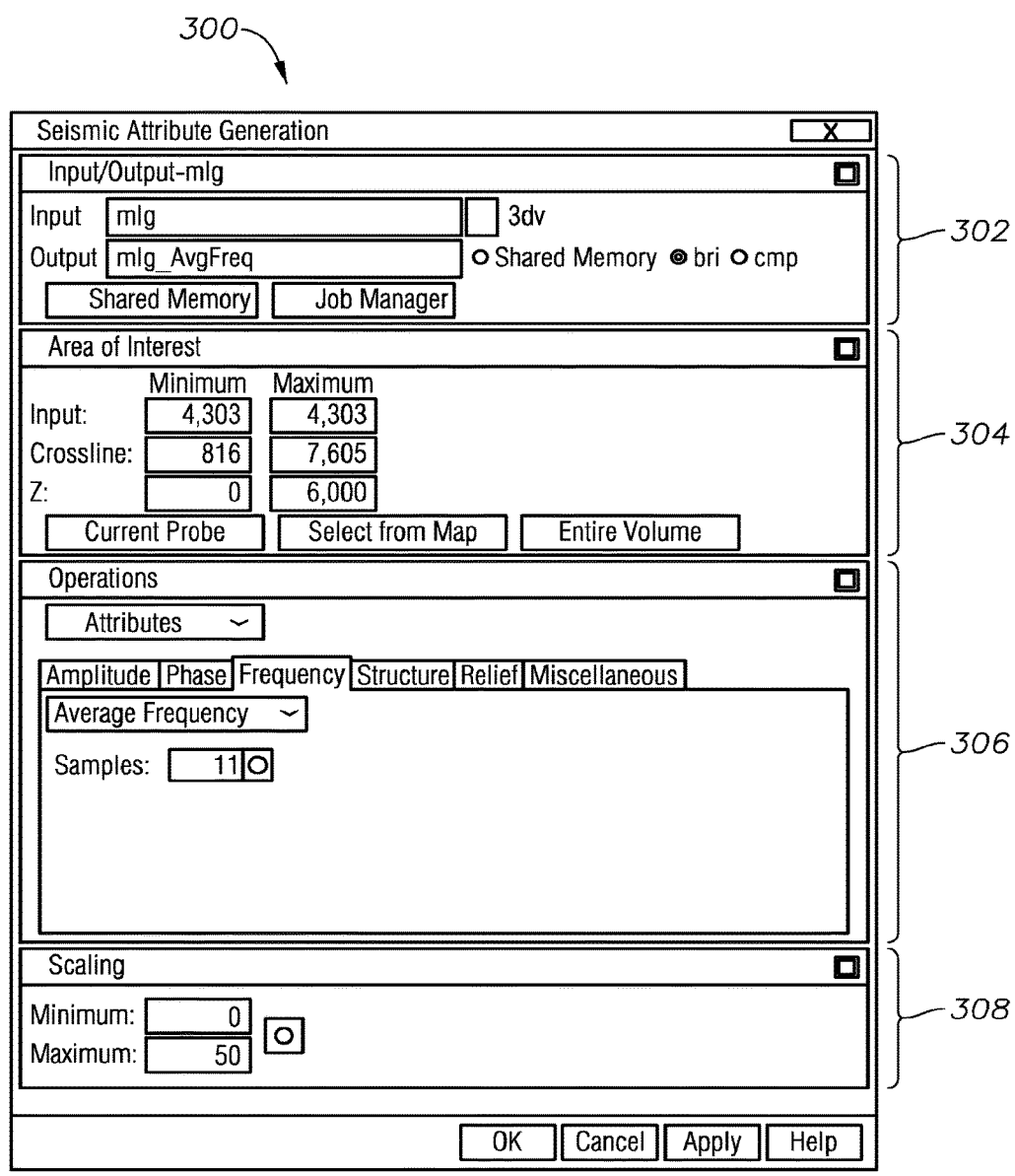
FIG. 3 illustrates a graphical user interface utilized to define input and output datasets, according to certain exemplary embodiments of the present disclosure.

FIG. 3 illustrates a graphical user interface 300 utilized to define input and output datasets using an exemplary embodiment of the present disclosure. Graphical user interface 300 includes windows 302, 304, 306 and 308. In window 302, the user is allowed to define the input and output datasets and name the files as desired. In this example, the three options on the Output data let the user specify the format of that output data. Shared Memory means to write the output to memory and not to the database. Bri and cmp are two dataset formats that the user may select. The Job Manager will let the user see the job(s) that are running, see their progress, and pause or kill a job if desired.

After the user has defined the input dataset in window 302, window 304 allows the user to then define what particular area of interest within the input dataset he/she would like to analyze. The selected area of interest may be defined using the inline, crossline and z range. In addition, the area of interest may also be defined using the Current Probe, Selected From Map, and Entire Volume buttons. In this example, the current probe is the selected probe in the Cube View. A probe is a 3D box that is a subset of the seismic volume in the Cube view. Selecting the Current Probe button will populate the Inline, Crossline, and Z fields with the values defined by the extent of the probe. The Select from Map button allows the user to select the inline and crossline range by drawing a rectangle in a map view. The Entire Volume button will reset all of the values to the full extent of the volume.

Window 306 allows the user to then define what operation is to be performed on the selected input dataset. In this example, the attributes may include amplitude, phase, frequency, structure, relief or miscellaneous. Average frequency is shown as being the selected operation, wherein 11 samples are to be utilized from within the input dataset. Window 308 then allows scaling. In this example, seismic data includes many data elements that are defined by a floating point value. The range of values in a dataset can be very large. This data needs to be scaled so that all of the values fit into a range of −128 to 127 so that the data can be displayed using 8 bit color. Scaling is the process of transforming the original floating point sample value to a value in the −128 to 127 range.

Once scaling has been defined, using the buttons in the lower right hand corner of interface 300, the user may click Apply, which then prompts smart grouping system 100 to perform the defined operation on the input dataset. Once performed, the output dataset is generated in, for example, a file named using the name defined in Window 302. In addition, as previously described, smart grouping system 100 also records the operation performed and the relationship between then input and output datasets.

Note that graphical user interface 300 is only one exemplary implementation, as those ordinarily skilled in the art having the benefit of this disclosure realize any variety of user interfaces may be utilized within the present disclosure. For example, various Windows may also allow entry of defined input horizon datasets and operations to be performed thereon including, for example, MaxPeak, TotalEnergy, Root Mean Squared (RMS), and MeanAbs. Nevertheless, once the input dataset has been the defined and the operations performed, smart grouping system 100 then records the processing data in order to display the relationships as defined herein.

Figure 4A:
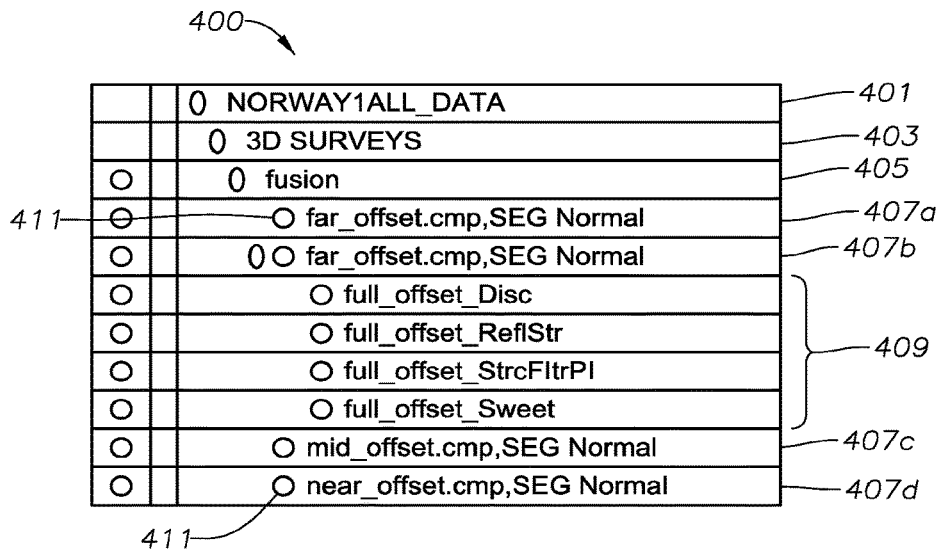
FIGS. 4A and 4B illustrate exemplary inventory trees generated according to the certain embodiments of the present disclosure.
Figure 4B:
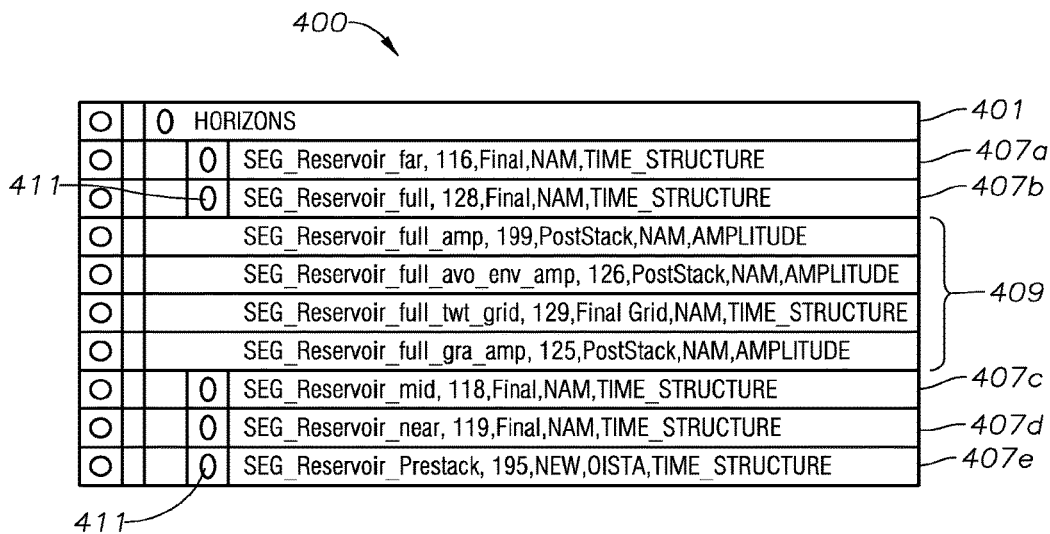

Referring back to FIG. 2B, certain exemplary embodiments of user interface 200 also include a Window D in which an inventory tree 205 is displayed as described herein. FIGS. 4A and 4B illustrate exemplary inventory trees generated according to the present disclosure, which may then be displayed in Window D. In FIG. 4A, inventory tree 400 is a collapsible, hierarchical grouping of parent and child seismic volumes. In this example, 401 denotes the project name which is pre-defined, 403 denotes the data type such as 3D surveys, 405 is 3D seismic survey name, below it are the available seismic datasets within 405. 407*a-e* denote peer volume input datasets, and 409 denotes output child volume datasets of parent volume input dataset 407*b*. Thus, upon viewing inventory tree 400, a user can readily decipher the relationship between input and output datasets. Also, to further increase user-friendliness of inventory tree 400, icons 411 are positioned beside each input/output dataset to identify whether each is has child output datasets.

FIG. 4B is similar to FIG. 4A, except that here parent and child horizon are instead illustrated in inventory tree 400. Again, 401 illustrates the horizon data type, 407*a-3* represents peer horizon input datasets, with 409 representing the output child horizon datasets of parent 407*b*. Again, the user can readily decipher the relationship between input and output datasets.

The foregoing methods and systems described herein are particularly useful in interpreting multiple input seismic volumes such as in 4D or multi-azimuth seismic. As described, the system generates an inventory tree that readily shows the processing history and relationship between various input and output datasets, thus enabling the user to more efficiently analyze a reservoir of interest. Thereafter, using the present disclosure, a well may be simulated, planned, or an existing wellbore may be altered in real-time and/or further operations may be altered. In addition, well equipment may be identified and prepared based upon the determined well plan, and the wellbore is then drilled, stimulated, altered and/or completed in accordance to the determined well placement or stimulation plan.

The present disclosure provides a number of advantages. For example, datasets may be auto-arranged in the most meaningful tree structure based on their true relationship captured in the processing history data model via process history module 112. In addition to auto-grouping the input and output datasets based on processing history records, the datasets may also be dynamically regrouped in the inventory each time the processing history is updated during the user work session.

The exemplary embodiments described herein further relate to any one or more of the following paragraphs:

1. A computer-implemented method to intelligently group seismic interpretation data in an inventory tree based on processing history, the method including: generating a seismic interpretation model of a hydrocarbon reservoir, the seismic interpretation model including seismic volume and horizon datasets; selecting an input dataset within the seismic interpretation model; performing an operation on the input dataset to thereby generate an output dataset; generating a record of the performed operation, the record also reflecting a relationship between the input and output datasets; and utilizing the record to generate an inventory tree including: the input dataset; the output dataset; and the relationship between the input and output datasets.

2. A computer-implemented method as defined in paragraph 1, wherein: the input dataset is a two or three dimensional volume dataset; and the output dataset is at least one of: a two or three dimensional volume dataset; or a horizon dataset representing a stratigraphic layer along the hydrocarbon reservoir, wherein the inventory tree includes the relationship between the volume dataset and the output dataset.

3. A computer-implemented method as defined in paragraphs 1 or 2, wherein the input or output datasets includes: a two or three dimensional volume dataset; or a horizon dataset that represents a stratigraphic layer along the hydrocarbon reservoir.

4. A computer-implemented method as defined in paragraph 3, wherein generating the inventory tree further includes grouping the input and output datasets in a fashion such that a parent horizon dataset is followed by a parent volume dataset, the parent volume dataset then being followed by a child horizon dataset, thereby reflecting the relationship between the input and output datasets.

5. A computer-implemented method as defined in any of the paragraphs 1-4, wherein a plurality of output datasets are generated from within the input dataset, the inventory tree displaying the plurality of output datasets in alphabetical order.

6. A computer-implemented method as defined in any of the paragraphs 1-5, wherein the relationship between the input and output datasets includes at least one of: the operation performed on the input dataset; or the input dataset utilized to generate the output dataset.

7. A computer-implemented method as defined in any of the paragraphs 1-6, wherein selecting the input dataset further includes selecting an area of interest within the input dataset as the input dataset.

8. A computer-implemented method as defined in any of the paragraphs 1-7, wherein performing the operation on the input dataset includes performing at least one of an amplitude, phase or frequency analysis of the input dataset.

9. A computer-implemented method as defined in any of the paragraphs 1-8, further including: updating the record each time an operation is performed on an input dataset; and updating the inventory tree based upon the updated record.

Furthermore, the exemplary methodologies described herein may be implemented by a system including processing circuitry or a computer program product including instructions which, when executed by at least one processor, causes the processor to perform any of the methodology described herein.

Although various embodiments and methodologies have been shown and described, the present disclosure is not limited to such embodiments and methodologies and will be understood to include all modifications and variations as would be apparent to one skilled in the art. For example, although described in the context of a hydrocarbon reservoir application, the present disclosure is also applicable to other fields in which data is arranged in inventory trees. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method of grouping and displaying seismic interpretation data in a user interface based on processing history, the method comprising:
   generating, by a computer system, a seismic interpretation model of a hydrocarbon reservoir, the seismic interpretation model comprising seismic volume and horizon datasets;
   responsive to receiving, by the computer system, user input via a graphical user interface of the computer system, selecting an input dataset including one or more input seismic volume and horizon datasets from the seismic volume and horizon datasets within the seismic interpretation model;
   performing, by the computer system, an operation on the input dataset to thereby generate an output dataset, based on the received user input, the output dataset including at least one of an output seismic volume or an output horizon dataset generated from the one or more input seismic volume and horizon datasets;
   generating, by the computer system, a record of the performed operation, the record reflecting a relationship between the input and output datasets based on the performed operation;
   generating, by the computer system, an inventory tree including a hierarchical grouping of the one or more input seismic volume and horizon datasets from the input dataset and the at least one output seismic volume or output horizon dataset from the output dataset based on the relationship between the input and output datasets reflected in the record; and
   displaying the generated inventory tree including the hierarchical grouping showing the relationship between the input and output datasets within the graphical user interface, wherein the record is updated each time an operation is performed on a selected input dataset, and the input and output datasets in the displayed inventory tree are dynamically regrouped each time the record is updated.

2. The computer-implemented method as defined in claim 1, wherein:
   the input dataset is at least one of a two dimensional dataset or a three dimensional volume dataset; and
   the output dataset is at least one of:
   a two dimensional dataset;
   a three dimensional volume dataset; or
   a horizon dataset representing a stratigraphic layer along the hydrocarbon reservoir, wherein the inventory tree comprises the relationship between the volume dataset and the output dataset.

3. The computer-implemented method as defined in claim 1, wherein each of the input and output datasets comprise at least one of:
   a two dimensional dataset;
   a three dimensional volume dataset; or
   a horizon dataset that represents a stratigraphic layer along the hydrocarbon reservoir.

4. The computer-implemented method as defined in claim 3, wherein generating the inventory tree further comprises grouping the input and output datasets in a fashion such that a parent horizon dataset is followed by a parent volume dataset, the parent volume dataset then being followed by a child horizon dataset, thereby reflecting the relationship between the input and output datasets.

5. The computer-implemented method as defined in claim 1, wherein a plurality of output datasets are generated from within the input dataset, the inventory tree displaying the plurality of output datasets in alphabetical order.

6. The computer-implemented method as defined in claim 1, wherein the relationship between the input and output datasets comprises at least one of:
   the operation performed on the input dataset; or
   the input dataset utilized to generate the output dataset.

7. The computer-implemented method as defined in claim 1, wherein selecting the input dataset further comprises selecting an area of interest within the input dataset as the input dataset.

8. The computer-implemented method as defined in claim 1, wherein performing the operation on the input dataset comprises performing at least one of an amplitude, phase or frequency analysis of the input dataset.

9. The computer-implemented method as defined in claim 1, further comprising:
   updating the record each time an operation is performed on an input dataset, based on a type of the operation that is performed; and
   updating the inventory tree based upon the updated record.

10. A system comprising:
    at least one processor; and
    a memory coupled to the processor, the memory storing instructions, which when executed by the processor cause the processor to:
    generate a seismic interpretation model of a hydrocarbon reservoir, the seismic interpretation model comprising seismic volume and horizon datasets;
    select an input dataset within the seismic interpretation model, based on user input received via a graphical user interface of the system, the input dataset including one or more input seismic volume and horizon datasets from the seismic volume and horizon datasets of the seismic interpretation model;
    perform an operation on the input dataset to thereby generate an output dataset based on the received user input, the output dataset including at least one of an output seismic volume or an output horizon dataset generated from the one or more input seismic volume and horizon datasets;
    generate a record of the performed operation, the record reflecting a relationship between the input and output datasets based on the operation performed on the input dataset to generate the output dataset;

generate an inventory tree including a hierarchical grouping of the one or more input seismic volume and horizon datasets from the input dataset and the at least one output seismic volume or output horizon dataset from the output dataset, based on the relationship between the input and output datasets reflected in the record; and display the generated inventory tree including the hierarchical grouping showing the relationship between the input and output datasets within the graphical user interface, wherein the record is updated each time an operation is performed on a selected input dataset, and the input and output datasets in the displayed inventory tree are dynamically regrouped each time the record is updated.

11. A non-transitory computer-readable storage medium comprising instructions stored therein, which, when executed by at least one processor, causes the processor to perform a plurality of operations, including operations to:

generate a seismic interpretation model of a hydrocarbon reservoir, the seismic interpretation model comprising seismic volume and horizon datasets;

select an input dataset within the seismic interpretation model, based on user input received via a graphical user interface, the input dataset including one or more input seismic volume and horizon datasets from the seismic volume and horizon datasets of the seismic interpretation model;

perform an operation on the input dataset to thereby generate an output dataset, based on the received user input, the output dataset including at least one of an output seismic volume or an output horizon dataset generated from the one or more input seismic volume and horizon datasets;

generate a record of the performed operation, the record reflecting at least one relationship between the input and output datasets, the relationship including at least one of the input dataset that is selected or the operation that is performed on the input dataset to generate the output dataset;

generate an inventory tree including a hierarchical grouping of the one or more input seismic volume and horizon datasets from the input dataset and the at least one output seismic volume or output horizon dataset from the output dataset, based on the relationship between the input and output datasets reflected in the record; and display the generated inventory tree including the hierarchical grouping showing the relationship between the input and output datasets within the graphical user interface, wherein the record and the hierarchical grouping in the displayed inventory tree are dynamically updated each time an operation is performed on an input dataset.

12. The system of claim 10, wherein each of the input and output datasets comprise at least one of:
a two dimensional dataset;
a three dimensional volume dataset; or
a horizon dataset that represents a stratigraphic layer along the hydrocarbon reservoir.

13. The system of claim 12, wherein the inventory tree is generated by grouping the input and output datasets in a fashion such that a parent horizon dataset is followed by a parent volume dataset, the parent volume dataset then being followed by a child horizon dataset, thereby reflecting the relationship between the input and output datasets.

14. The system of claim 10, wherein a plurality of output datasets are generated from within the input dataset, and the inventory tree displays the plurality of output datasets in alphabetical order.

15. The system of claim 10, wherein the operation performed on the input dataset includes at least one of an amplitude, phase or frequency analysis of the input dataset.

16. The system of claim 10, wherein the instructions, when executed by the processor, further cause the processor to:
update the record each time an operation is performed on an input dataset, based on a type of the operation that is performed; and
update the inventory tree based upon the updated record.

17. The non-transitory computer-readable storage medium of claim 11, wherein each of the input and output datasets comprise at least one of:
a two dimensional dataset;
a three dimensional volume dataset; or
a horizon dataset that represents a stratigraphic layer along the hydrocarbon reservoir.

18. The non-transitory computer-readable storage medium of claim 17, wherein the inventory tree is generated by grouping the input and output datasets in a fashion such that a parent horizon dataset is followed by a parent volume dataset, the parent volume dataset then being followed by a child horizon dataset, thereby reflecting the relationship between the input and output datasets.

19. The non-transitory computer-readable storage medium of claim 11, wherein a plurality of output datasets are generated from within the input dataset, and the inventory tree displays the plurality of output datasets in alphabetical order.

20. The non-transitory computer-readable storage medium of claim 11, wherein the operation performed on the input dataset includes at least one of an amplitude, phase or frequency analysis of the input dataset.

* * * * *